(12) United States Patent
Gebbeken et al.

(10) Patent No.: US 9,797,454 B2
(45) Date of Patent: Oct. 24, 2017

(54) BEARING UNIT FOR A DOUBLE DISC COULTER

(71) Applicant: LEMKEN GmbH & Co. KG, Alpen (DE)

(72) Inventors: Martin Gebbeken, Alpen (DE); Dieter Werries, Alpen (DE); Christian Paessens, Issum (DE); Thomas Lukas, Ahaus-Wüllen (DE); Mark Berendsen, AJ Lengel (NL); Christian Gotzen, Viersen (DE); Marcel Geraats, Nettetal (DE)

(73) Assignee: LEMKEN GmbH & Co., KG, Alpen (DE)

(*) Notice: Subject to any disclaimer, the term of this patent is extended or adjusted under 35 U.S.C. 154(b) by 43 days.

(21) Appl. No.: 14/413,717

(22) PCT Filed: Jul. 9, 2013

(86) PCT No.: PCT/DE2013/000371
§ 371 (c)(1),
(2) Date: Jan. 9, 2015

(87) PCT Pub. No.: WO2014/008882
PCT Pub. Date: Jan. 16, 2014

(65) Prior Publication Data
US 2015/0176653 A1    Jun. 25, 2015

(30) Foreign Application Priority Data

Jul. 9, 2012    (DE) .................. 10 2012 013 686

(51) Int. Cl.
*F16C 13/00*    (2006.01)
*F16C 33/78*    (2006.01)
(Continued)

(52) U.S. Cl.
CPC .......... *F16C 33/7896* (2013.01); *A01B 71/04* (2013.01); *F16C 19/08* (2013.01);
(Continued)

(58) Field of Classification Search
CPC ........ F19C 19/04; F19C 19/08; F19C 33/723; F19C 33/7853; F19C 33/7856;
(Continued)

(56) References Cited

U.S. PATENT DOCUMENTS 2,712,966 A    7/1955    Brady
3,978,566 A *  9/1976    Ladin .................... F16C 19/163
                                                          29/413
(Continued)

FOREIGN PATENT DOCUMENTS

DE    2610974 A1    9/1976
DE    7900576 U1    5/1979
(Continued)

*Primary Examiner* — James Pilkington
(74) *Attorney, Agent, or Firm* — James Creighton Wray; Meera P. Narasimhan

(57) ABSTRACT

A compact bearing unit (1) for a double disc coulter (2) with ball bearing (23) with an inner ring (3), outer ring (5) with flange facing and a protective cap (7) has a multi-stage sealing system. A first seal (11) is provided between the inner ring 3 and an internal ring race (17) of the outer ring (5). At least one additional seal (14) is arranged between the protective cap (7) and a ring race (13, 17) of the outer ring (5), whereby said seal does not make any additional installation space necessary in the axial direction of the bearing unit (1).

10 Claims, 2 Drawing Sheets

(51) Int. Cl.
  *A01B 71/04* (2006.01)
  *F16C 19/08* (2006.01)
  *F16C 19/16* (2006.01)
  *F16C 19/18* (2006.01)
(52) U.S. Cl.
  CPC .......... *F16C 33/7886* (2013.01); *F16C 19/16* (2013.01); *F16C 19/184* (2013.01); *F16C 33/7853* (2013.01); *F16C 2310/00* (2013.01)
(58) Field of Classification Search
  CPC .............. F19C 33/7863; F19C 33/7886; F19C 33/7889; F19C 33/7896; F19C 2310/00; A01B 71/04
  See application file for complete search history.

(56) References Cited

U.S. PATENT DOCUMENTS 4,201,425 A * 5/1980 Freund .................. F16C 19/166
                                                206/318

| | | | | |
|---|---|---|---|---|
| 2010/0025057 | A1* | 2/2010 | Andersson | ............ A01B 71/04 172/556 |
| 2015/0156954 | A1* | 6/2015 | Ciulla | .................... A01B 71/04 384/460 |
| 2015/0267753 | A1* | 9/2015 | Ciulla | .................. F16C 33/723 384/489 |

FOREIGN PATENT DOCUMENTS

| | | |
|---|---|---|
| DE | 2913064 A1 | 10/1979 |
| DE | 19728606 A1 | 1/1999 |
| DE | 20300466 U1 | 3/2003 |
| DE | 102006007580 A1 | 9/2007 |
| DE | 102008051065 A1 | 4/2010 |
| EP | 0889254 A2 | 1/1999 |
| WO | 0219791 A1 | 3/2002 |
| WO | 2007093534 A1 | 8/2007 |
| WO | 2010124731 A1 | 11/2010 |

* cited by examiner

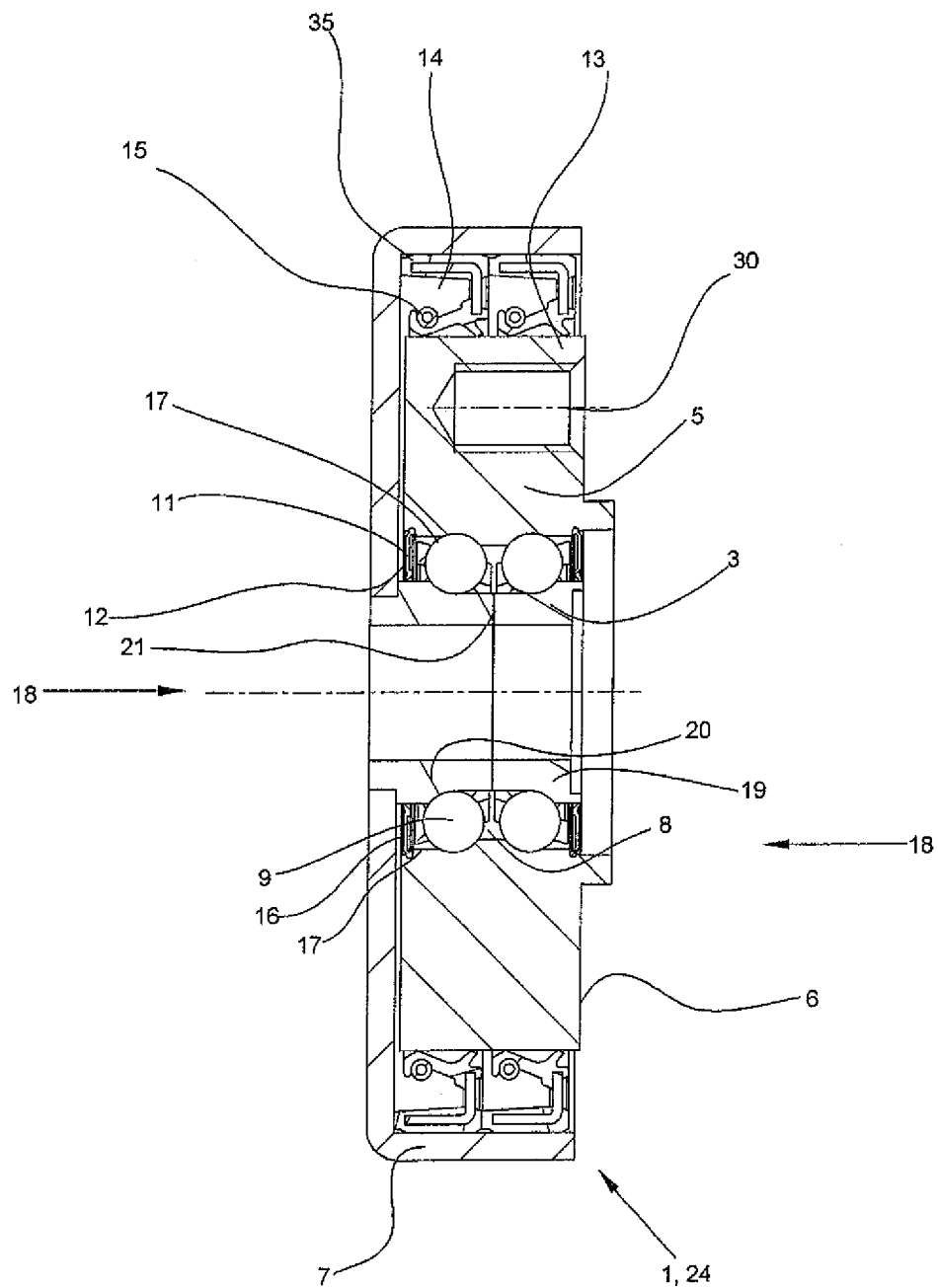

BEARING UNIT FOR A DOUBLE DISC COULTER

CROSS-REFERENCE TO RELATED APPLICATIONS

This application claims the benefit of German Application No. 10 2012 013 686.2 filed Jul. 9, 2012, and PCT/DE2013/000371 filed Jul. 9, 2013, International Publication No. WO 2014/00882, which are hereby incorporated by reference in their entirety as if fully set forth herein.

The invention concerns a bearing unit for a double disc coulter.

BACKGROUND OF THE INVENTION

Such bearing units are used also for disc coulters and are under particularly high strain due to the dust produced. They therefore have to be particularly well protected from dirt. In the case of pneumatic seed drills in particular, as well as fertiliser coulters, the bearing units are under particularly high strain because dust is also blown up and seed dressing agents or fertilisers can get to the bearing units as well. The seals are designed accordingly or several seals or cassette seals are used, which make the route to the balls and races of the bearing unit extremely long for any dust that gets in. These sealings need a wide installation space, making the amount of free space considerably smaller, especially when the lateral distances between the disc coulters are narrow. This frequently leads to blockages.

The objective of the invention is to create a bearing unit for a double disc coulter, containing a particularly good sealing, requiring little installation space and thus also ensuring a sufficient amount of free space between the individual disc coulters, even in the case of narrow distances between the rows of disc coulters.

The objective according to the present invention is achieved as described. Supplementary and alternative solutions being set out in an advantageous manner as claimed.

Through the provision of a double seal between the inner ring and the outer ring or on the outer ring race of the outer ring, the route to the balls is considerably extended for any dirt that gets in, without having to increase the distance between the disc coulters. This multi-stage sealing system does not make any additional installation space necessary, particularly in the axial direction of the bearing unit.

An advantageous execution of the invention is where the outer edge, facing away from the mounting flange, of the second, additional seal, has approximately the same distance to the mounting flange of the disc coulter as the outer edge of the seal arranged on the internal ring race of the outer ring. The existing seal between the outer ring and inner ring determines the necessary installation space of the bearing unit in axial direction. Through the outer edge of the second seal having roughly the same distance to the mounting flange of the disc coulter, the necessary installation space in axial direction is not increased despite the additional seal.

It is also provided for the inner ring to be connected to the coulter support of the disc coulter via the axis and the outer ring to be connected with the disc coulter via the mounting flange.

Sealing is particularly effective if the first seal is arranged in the gap formed by the inner ring, the outer ring as well as the protective cap and the cage. As the first component of the multi-stage seal, the seal sits within this gap, limited by the inner and outer ring on the one hand and the protective cap and cage or balls on the other hand.

As an alternative or supplement to this, it is provided for the second seal to be arranged in the gap formed by the outer ring and the protective cap. It is then located roughly within an extension of the borehole for the receiving of a screw serving for the attachment of the disc coulter and bearing unit and conveniently fills out this space also. Thanks to this multi-stage seal, a particularly compact bearing unit with a small installation space width can be realised.

In order to make a precise seating of the respective seals possible, it is provided for the seal to be positioned in a force fit between the inner ring and outer ring or outer ring and protective cap, meaning the seal is given its place and is held in its position at the same time. The outer ring and/or inner ring for the first seal provide a recess or projection in the gap for this purpose, giving the seal its forced fit or limiting the latter respectively. As regards the second seal between the outer ring and protective cap, this recess or projection is provided in the outer ring and/or the protective cap.

According to the present invention, it is also conceived for at least two additional seals to be arranged between the outer ring race and the protective cap, which are arranged one behind the other in the axial direction of the axis. Through the provision of several additional seals between the outer ring race and the outer housing, the route mentioned is extended even further, considerably improving the effect of the sealing of the bearing unit. This solution does not increase the necessary installation space mentioned in the axial direction of the axis either.

The present invention furthermore provides for the inner ring to be designed as a two-piece ring and consist of a first inner ring and a second inner ring, and for the part level to be located in the centre of the ball race in the case of a single-row ball bearing. This embodiment makes a backlash-free use of the bearing unit possible, which can also be used as a preloaded unit thanks to the divided inner ring.

A further embodiment of the invention is where the inner ring is designed as a two-piece ring and the part level is located between the races of the two rows of balls in the case of a double-row ball bearing.

The initial objective set can additionally be achieved through a first seal being arranged between the inner ring and the outer ring on the side opposite the mounting flange and a second seal being arranged, on the side opposite the mounting flange, between the outer ring and protective cap on the internal ring race of the outer ring.

With this embodiment, two seals are positioned one behind the other as a kind of seal package in order to ensure sealing between the inner ring and outer ring on the one hand, and between the outer ring and protective cap on the other hand. Looking from the direction of the ball or cage, a first, internal seal sits between the inner and outer ring here and a second, external seal between the outer ring and protective cap. In order to bridge the distances between the inner and outer ring and in order to stabilise the seals formed of flexible material, metal clips can be used, which form a common construction unit together with the seal.

Further details of the invention can be found in the figures and figure description.

BRIEF DESCRIPTION OF THE DRAWINGS

FIG. 2: Shows a bearing unit with a double-row ball bearing and divided inner ring.

SUMMARY OF THE INVENTION

Detailed Description

Figure 1:
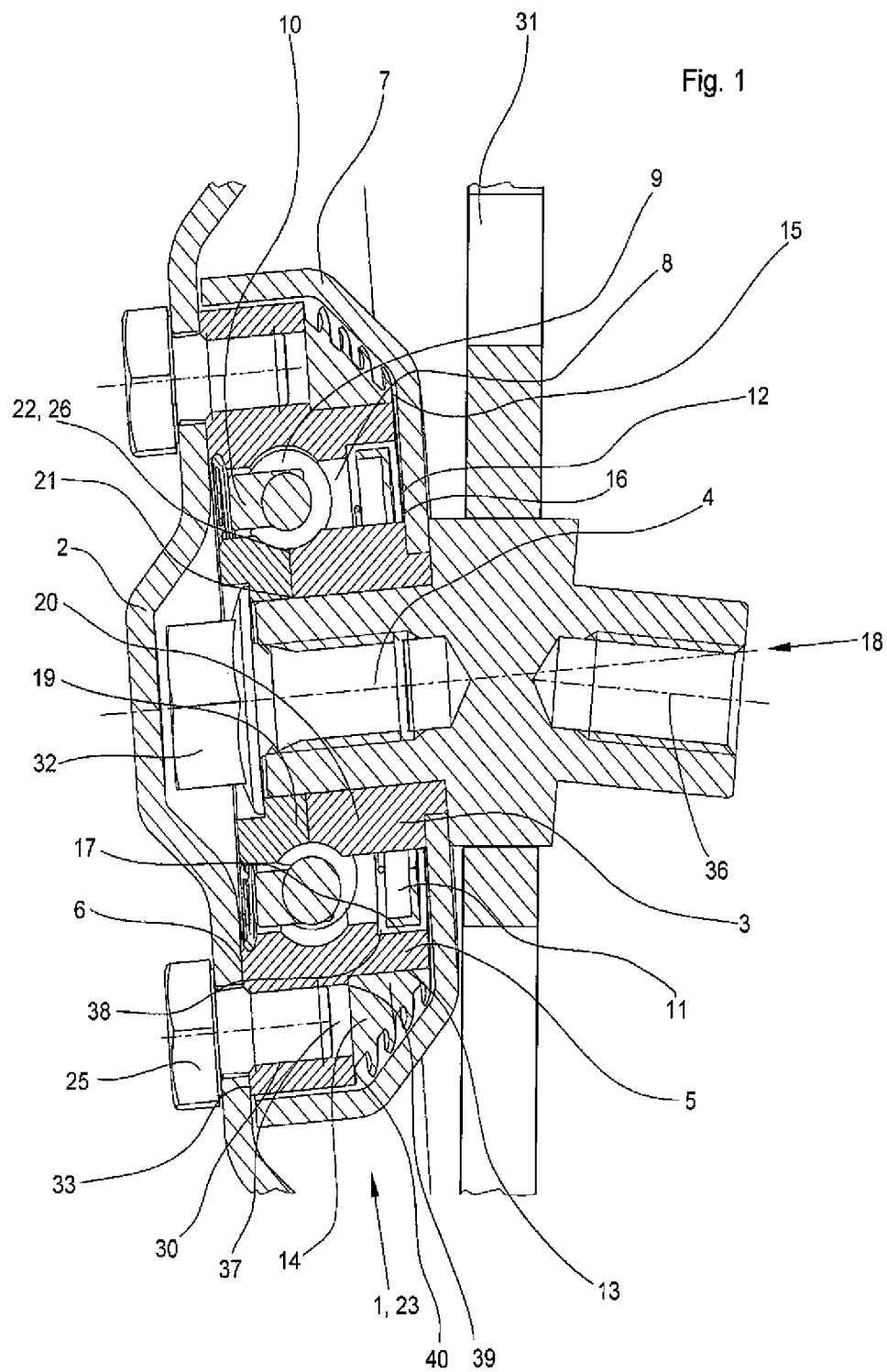
FIG. 1: Shows a bearing unit with a single-row ball bearing and divided inner ring

FIG. 1 shows a bearing unit 1 for a double disc coulter. Of this, only the disc coulter 2 sitting in the axis 4 is shown in the representation according to FIG. 1 for the sake of better clarity. With the second coulter sitting in the axis 36 and not shown here, this forms a V-shaped double disc coulter with the respective bearing unit. The coulter 2 has a single-row ball bearing 23 and a divided inner ring 3. It is also conceivable for a divided outer ring 5 to be used instead of a divided inner ring 3. The inner ring 3 consists here of the first inner ring 19 and the second inner ring 20. The part level or split 21 of the divided inner ring 3 is located in the centre 22 of the race 26 of the balls 9 in the case of this single-row ball bearing 23. The outer ring 5 contains the mounting flange 6 for the attachment of the double disc coulter 2. In the gap 8 of the inner ring 3 and of the outer ring 5, the balls 9 are located along with the cage 10 of the bearing unit 1. The mounting flange 6 has threaded holes 30 for the receiving of the fastening screws 25, with which the disc coulter 2 is fastened to the bearing unit 1. Also conceivable are quick-action fastening systems with a screw or nut or with plug-in systems, with which the disc coulter 2 can be quickly connected to the bearing unit 1. Only the part of disc coulter 2 is shown here that is connected with the flange 6 of the outer ring 5. The bearing unit 1, together with disc coulter 2, is connected with the coulter carrier 31 here by means of the screw 32. Between the inner ring 3 or the second inner ring 20 and the outer ring 5, the first seal 11 is located on the side 12 located opposite the mounting flange 6. It is arranged on the inner ring race 17. The outer ring 5 is offset on the side 12 for the receiving of the second, additional seal 14. The additional seal 14 is located between the outer ring race 13 and the protective cap 7. The outer edge 15 of the additional seal 14 has approximately the same distance to the mounting flange 6 of the outer ring 5 as the outer edge 16, facing away from the mounting flange 6, of the first seal 11. In this case, the additional seal 14 is a kind of axial shaft sealing ring. The first, internal seal 11 is arranged in the gap 8, which stretches between inner ring 3, outer ring 5, protective cap 7 and cage 10 or ball 9, meaning a particularly targeted sealing is possible. This is particularly the case with a force fit for this seal 11, for which a projection 38 is provided in the outer ring 5. The double seal is then created through the second, outer seal 14, which is arranged in the gap 37. The latter is formed by the outer ring 5 and the protective cap 7, whereby the seal 14 sits within the extension of the screw 25 for the attachment of disc coulter 2 and bearing unit 1 and completely fills out the gap 37. The two offsets 39 and 40, formed by the threaded hole 30, offer permanent firm seating of the seal 14 in the gap 37. Other kinds of seal can also be used here without having a negative effect on the compact structure of the bearing unit 1. In the axial direction 18 of the axis 4 of the disc support 31, the width of the bearing unit 1 is not additionally increased through this. A seal 33 is located between the disc coulter 2 and the mounting flange 6 of the outer ring 5 and thus prevents dirt from getting into the gap 8 of the bearing unit 1 on the side of the mounting flange 6. This seal 33 can be designed as a flat seal as in FIG. 1, or alternatively as an O-ring, or be integrated into the seal 14. The use of a permanently elastic sealant is also conceivable.

FIG. 2 shows a bearing unit 1 with a double-row ball bearing 24 and divided inner ring 3. It is also conceivable for a divided outer ring 5 to be used instead of a divided inner ring 3. The inner ring 3 consists of the first inner ring 19 and the second inner ring 20. The part level or split 21 of the divided inner ring 3 is located between the two races of the two ball rows of the balls 9 in the case of this double-row ball bearing 24. The outer ring 5 contains the mounting flange 6 for the attachment of the disc coulter. In the gap 8 between the inner ring 3 and the outer ring 5, the balls 9 are located. The mounting flange 6 has threaded holes 30 for the receiving of the fastening screws, with which the disc coulter not shown is fastened to the bearing unit 1. Between the inner ring 3 or the second inner ring 20 and the outer ring 5, the seal 11 is arranged on the inner ring race 17 on the side 12 located opposite the mounting flange 6. Between the outer ring race 13 of the outer ring 5 and the protective cap 7, the additional seals 14 are located, which are arranged one beside the other. In this case, the additional seals 14 are radial shaft seals. Other kinds of seal can also be used here without having a negative effect on the compact structure of the bearing unit 1. The outer edge 15 of the outer additional seal 35, 14 has approximately the same distance to the mounting flange 6 of the outer ring 5 as the outer edge 16 of the seal 11. In the axial direction 18 of the axis 4 of the disc support 31, the width of the bearing unit 1 is not additionally increased through this. A press or force fit for additionally securing the position of the seals 14 could be assigned to the protective cap 7 on its inside and/or the outer ring 5 on the outer ring race 13.

The invention claimed is:

1. An apparatus comprising a double disc coulter with disc coulters arranged on the double disc coulter, a coulter carrier and at least one bearing unit, wherein:
   the double disc coulter includes a first axle and a second axle disposed on the coulter carrier on a first axis and a second axis respectively, the first axis and the second axis arranged to define a V-shape with one another,
   the at least one bearing unit comprising an inner ring mounted on the first axle or the second axle, an outer ring with a mounting flange for one of the disc coulters, a protective cap, a plurality of balls in a cage arranged in a gap between the inner ring and the outer ring, a first seal is arranged between the inner ring and the outer ring on a side opposite the mounting flange and a second seal is arranged, on the side opposite the mounting flange, between the outer ring and the protective cap on an external ring race of the outer ring, wherein an outer edge, facing away from the mounting flange of the second seal is approximately a same distance to the mounting flange of the disc coulter as an outer edge on an inner ring race of the outer ring of the first seal.

2. The apparatus according to claim 1, wherein the inner ring is connected with the coulter carrier of the disc coulter via the first or the second axle and the outer ring is connected with the disc coulter via the mounting flange.

3. The apparatus according to claim 1, wherein the first seal is arranged in the gap between the inner ring, the outer ring as well as between the protective cap and the cage.

4. The apparatus according to claim 3, wherein the first seal is positioned between the inner ring and the outer ring with a force fit and the second seal is positioned between the outer ring and the protective cap with a force fit.

5. The apparatus according to claim 4, wherein the outer ring and/or the inner ring for the first seal comprises a recess or a projection in the gap for the force fit.

6. The apparatus according to claim 4, wherein the outer ring and/or the protective cap for the second seal comprises a recess or a projection in the gap for the force fit.

7. The apparatus according to claim 1, wherein the second seal is arranged in another gap between the outer ring and the protective cap.

8. The apparatus according to claim 1, wherein the first seal and the second seal are arranged concentrically along an axial direction of the first axle or the second axle.

9. The apparatus according to claim 1, wherein the inner ring is a two-piece ring and consists of a first inner ring and a second inner ring, wherein the bearing unit includes a single-row ball bearing and a split is located in a center of a race of a row of balls in the single-row ball bearing.

10. The apparatus according to claim 1, wherein the inner ring is a two-piece ring and consists of a first inner ring and a second inner ring, and wherein the bearing unit includes a double-row ball bearing and a split is located between races of two ball rows in the double-row ball bearing.

* * * * *